United States Patent [19]

Grünert et al.

[11] 4,384,976
[45] May 24, 1983

[54] FOAM INHIBITOR USEFUL IN SYNTHETIC RESIN, LACQUER, AND PAINT DISPERSIONS

[75] Inventors: Margarete Grünert, Kaarst; Hans-Ulrich Hempel, Overath; Holger Tesmann, Düsseldorf, all of Fed. Rep. of Germany

[73] Assignee: Henkel Kommanditgesellschaft auf Aktien, Düsseldorf, Fed. Rep. of Germany

[21] Appl. No.: 246,109

[22] Filed: Mar. 20, 1981

[30] Foreign Application Priority Data

Mar. 24, 1980 [DE] Fed. Rep. of Germany ....... 3011304

[51] Int. Cl.³ .................... B01D 17/00; B01D 53/00
[52] U.S. Cl. ..................... 252/321; 252/328
[58] Field of Search .................. 252/321, 358

[56] References Cited

U.S. PATENT DOCUMENTS

| | | | |
|---|---|---|---|
| 2,906,712 | 9/1959 | Edwards et al. | 252/321 |
| 2,914,412 | 11/1959 | Stephan | 252/321 |
| 3,784,479 | 1/1974 | Keil | 252/358 |
| 3,846,329 | 11/1974 | Householder et al. | 252/321 |
| 3,912,652 | 10/1975 | Colquhoun | 252/358 |
| 3,951,832 | 4/1976 | McCoy | 252/358 |
| 3,962,119 | 6/1976 | Cosentino et al. | 252/321 |
| 4,208,385 | 6/1980 | Robbins et al. | 252/358 |

*Primary Examiner*—Allan Lieberman
*Attorney, Agent, or Firm*—Hammond & Littell, Weissenberger and Muserlian

[57] ABSTRACT

This invention relates to a foam inhibiting composition comprising:
(a) from about 3 to 10 percent by weight of a polysiloxane-polyether block polymer of the formula

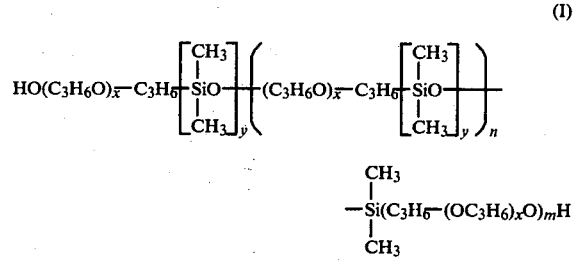

(I)

wherein m is 0 or 1, n is a number of from 0 to 2, x is a number of from 20 to 100, and y is a number of from 5 to 30;
(b) from about 65 to 85 percent by weight of a water-immisible oily substance selected from the group consisting of mineral oils, fatty oils, and fatty alcohols;
(c) from about 5 to 30 percent by weight of at least one additional substance with a foam-inhibiting effect selected from the group consisting of polypropylene glycol-polyethylene glycol block polymers with a molecular weight of from about 1000 to 4000, their monoesters or diesters with fatty acids and hydroxy-fatty acids containing from 18 to 24 carbon atoms, and the monoesters and diesters of said fatty acids and hydroxy-fatty acids with hydroxystearyl alcohol;
(d) from about 1 to 6 percent by weight of at least one emulsifying agent selected from the group consisting of polyglycol ether derivatives containing from 4 to 12 ethylene glycol ether groups adducted onto alkanols or alkenols with from 12 to 20 carbon atoms or alkylphenols with from 8 to 12 alkylcarbon atoms; and
(e) from about 1 to 5 percent by weight of at least one alkaline earth metal soap or aluminum soap of fatty acid containing from 16 to 20 carbon atoms, based on the weight of the total composition, and the use of said composition in aqueous dispersions of synthetic resins, lacquers, and paints.

8 Claims, No Drawings

FOAM INHIBITOR USEFUL IN SYNTHETIC RESIN, LACQUER, AND PAINT DISPERSIONS

FIELD OF THE INVENTION

This invention is directed to foam inhibitors. More specifically, this invention is directed to foam inhibitors that contain polysiloxane-polyether block polymers and that are useful in dispersions of synthetic resins, lacquers, and paints.

BACKGROUND OF THE INVENTION

Polysiloxane-polyether block polymers containing polyethylene glycol ether groups that make them soluble in water are known from U.S. Pat. Nos. 2,834,748, 3,480,583, 3,600,418, and 3,629,310 and from British Pat. No. 802,467. Such block polymers do have foam-inhibiting characteristics, but these characteristics are not well developed in comparison with the characteristics of dimethylpolysiloxanes. Consequently, such polysiloxane-polyether block polymers have found no application as antifoaming agents but have been used, for example, to prepare polyurethane foams, where they act as foam stabilizers. (Cf. U.S. Pat. Nos. 3,398,104, 3,402,192, and 3,637,783 and British Pat. No. 1,293,331.)

Polysilane block polymers that contain polypropylene glycol ether groups and are insoluble in water are known from U.S. Pat. No. 4,028,218 and British Pat. No. 1,505,665. Mixed with highly dispersed silica or highly dispersed alumina, these block polymers have pronounced foam-inhibiting characteristics. They may contain additional components that enhance the foam inhibition, such as mineral oil or emulsifying agents that promote dispersion in aqueous systems. The presence of the above-mentioned highly dispersed oxides, especially silica or a resin containing silica, is required in all cases. However, this constituent makes the antifoaming agents less suitable for certain areas of application, such as, for example, dispersions of synthetic resins, lacquers, or paints for the preparation of high-gloss or clear films and coatings. In these cases, polyether siloxanes containing silica or alumina cannot suppress the formation of microfoams adquately, which leads to a definite loss of gloss.

OBJECTS OF THE INVENTION

It is an object of the invention to provide a foam inhibitor useful in dispersions of synthetic resins, lacquers, and paints.

It is also an object of the invention to provide a foam inhibitor containing polysiloxane block polymers that are insoluble in water as well as additional compounds that enhance the foam-inhibiting effect of the block polymer.

It is a further object of the invention to provide a foam inhibitor that does not contain silica or silicic acid.

It is a yet further object of the invention to provide foam inhibitors useful in dispersions of synthetic resins, lacquers, and paints that do not result in a loss of gloss.

These and other objects of the invention will become more apparent in the discussion below.

DETAILED DESCRIPTION OF THE INVENTION

The present invention is related to foam inhibitors containing polysiloxane-polyether block polymers that are insoluble in water, as well as additional compounds that enhance the foam-inhibiting effect of the block polymer. The foam inhibitors do not contain alumina or silica or silicic acid and therefore are especially suitable for those areas of application where insoluble mineral components would interfere. More specifically, the invention relates to a foam inhibiting composition which comprises:

(a) from about 3 to 10 percent by weight of a polysiloxane-polyether block polymer of the formula

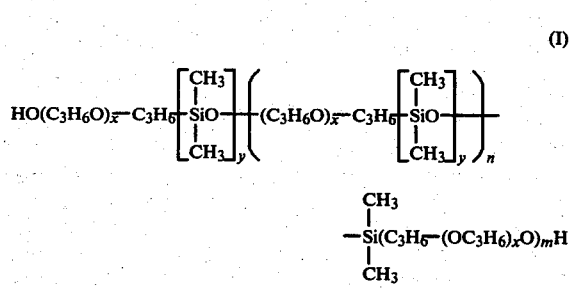

wherein m is 0 or 1, n is a number of from 0 to 2, x is a number of from 20 to 100, and y is a number of from 5 to 30;

(b) from about 65 to 85 percent by weight of a water-immiscible oily substance selected from the group consisting of mineral oils, fatty oils, and fatty alcohols;

(c) from about 5 to 30 percent by weight of at least one additional substance with a foam-inhibiting effect selected from the group consisting of polypropylene glycol-polyethylene glycol block polymers with a molecular weight of from about 1000 to 4000, their monoesters or diester with fatty acids and hydroxy-fatty acids containing from 18 to 24 carbon atoms, and the monoesters and diesters of said fatty acids and hydroxy-fatty acids with hydroxystearyl alochol;

(d) from about 1 to 6 percent by weight of at least one emulsifying agent selected from the group consisting of polyglycol ether derivatives containing from 4 to 12 ethylene glycol ether groups adducted onto alkanols or alkenols with from 12 to 20 carbon atoms or alkylphenols with from 8 to 12 alkylcarbon atoms; and (e) from about 1 to 5 percent by weight of at least one alkaline earth metal soap or aluminum soap of fatty acid containing from 16 to 20 carbon atoms, based on the weight of the total foam inhibiting composition.

The block polymers (a) can be obtained by a known method by first cohydrolyzing, for example, dimethyldichlorosilane and dimethylchlorosilane at a molar ratio of from about 3:1 to 20:1 and subsequently equilibrating in the presence of a Lewis acid at temperatures in the range from about 20° to 100° C. The polydimethyl siloxane obtained, which has the structural formula

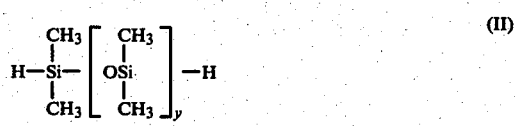

wherein y is as defined above, is heated for several hours with propoxylated allyl alcohol of the formula

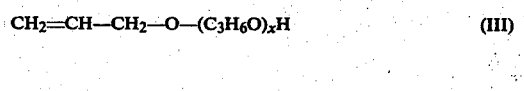

in the presence of hexachloroplatinic acid or a platinum catalyst fixated to active charcoal, at temperatures of, for example, from about 100° to 160° C., which results in the addition of the allyl group to the SiH-group. If the solution is alkaline, an etherification reaction between the terminal hydroxyl group of the allyl polyether and another SiH-group may occur simultaneously with the release of hydrogen. This side reaction can be suppressed completely or partially by the use of acid buffer solutions (cf. U.S. Pat. No. 3,398,174). This etherification reaction is not disadvantageous with respect to the preparation procedure.

In a preferred embodiment of the invention, the foam inhibiting compositions comprise block polymers (a) of Formula I wherein m is 0 or 1, n is 0 or 1, x is a number of from 30 to 60, and y is a number of from 12 to 20.

Component (b) preferably consists of mineral oil, for example, a paraffinic or naphthenic mineral oil, white oil, or a similar oil. If desired, the mineral oil may be replaced completely or partially by fatty oils, such as liquid triglycerides of fatty acids and partial glycerides derived from saturated and unsaturated $C_{10}$-$C_{18}$-fatty acids, or furthermore by liquid fatty alcohols and oxoalcohols of comparably chain length. Most preferably mineral oils, in amounts of from about 70 to 82 percent by weight, are employed.

The following substances are suitable as foam-inhibiting component (c):

(C-1) Ethylene oxide-propylene oxide block polymers with a molecular weight of from about 1000 to 4000, preferably from about 1500 to 3200 (as determined by gel permeation chromatograph), and a ratio of ethylene glycol ether groups to propylene glycol ether groups of from about 20:80 to 9:95, preferably about 10:90, (C-2) Fatty acid monoesters and diesters of ethylene oxide-propylene oxide block polymers, preferably of the block polymers identified above as C-1, in which case the saturated fatty acids or hydroxy fatty acids have from about 16 to 24 carbon atoms and may consist, for example, of palmitic, stearic, arachic, behenic, lignoceric, hydroxystearic, hydroxyarachic, or hydroxybehenic acid as well as of mixtures of two or more of said acids. The behenic acid monoesters and diesters of a polypropylene-polyethylene glycol block polymer (PO to EO ratio=from about 80:20 to 95:5) with behenic acid, for example, proved to be very suitable.

(C-3) Monoesters and diesters of the 9-, 10-, or 12- hydroxystearyl alcohols with saturated fatty acids or hydroxy-fatty acids, which contain from 18 to 22 carbon atoms and may consist of, for example, stearic, arachic, behenic, or hydroxystearic acid or mixtures of two or more of said acids. The behenic monoester or diester of the 9- to 10-hydroxysteryl alcohol proved to be especially suitable.

Component (c) is present in amounts of from about 5 to 30, preferably from about 10 to 20, percent by weight, based on the weight of the total foam inhibiting composition.

Suitable as dispersing agent (d), which is present in amounts of from about 1 to 6, preferably from about 2 to 5, percent by weight, based on the weight of the total foam inhibiting composition, are polyethylene glycol ethers of alkanols and alkenols with from 12 to 20 carbon atoms, which may have synthetic or natural origins, and consist, for example, of lauryl, myristyl, cetyl, stearyl, oleyl, coconut, palm kernel, or tallow alcohols or oxoalcohols, and contain an average of from 4 to 12, preferably from 5 to 10, ethylene glycol ether groups. Particularly suitable are, for example, oleyl alcohols as well as mixtures thereof with saturated $C_{14-18}$-alcohols containing from 5 to 8 ethylene glycol ether groups. Also suitable, instead of the mentioned ethoxylated alcohols, are ethoxylated alkylphenols with linear alkyl groups containing from 4 to 12, particularly from 7 to 10, ethylene glycol ether groups and from 8 to 12, preferably from 9 to 10, carbon atoms in the alkyl.

Component (e), which acts as stabilizing agent, comprises soaps of saturated fatty acids with from 16 to 20 carbon atoms and alkaline earth metals, preferably of magnesium, or aluminum. Especially suitable are magnesium and aluminum stearate. The proportion of component (e) is from about 1 to 5, preferably from about 2 to 4, percent by weight, based on the weight of the total foam inhibiting composition.

The foam inhibitors according to the invention are prepared by homogenizing a mixture of the above-mentioned components, preferably with heating to temperatures of from about 90° to 110° C. In the event of such heating, it is advisable to add components (b) and (c), followed by the components (d), (e), and (a) in the given order. The mixture is stable on storing, although it may be used immediately for its intended purpose.

The foam inhibiting composition according to the invention is exceptionally suitable for the inhibition of foam in those systems in which the presence of insoluble silica, silicic acid, or alumina would be an interfering factor. Such systems especially include dispersions of synthetic resins, lacquers, and paints that have a tendency to form foam and that are intended for the preparation of clear or highly glossy formed parts, lacquers, and coatings. The amounts of foam inhibitor to be used in such preparations are from about 0.01 to 1.5 percent by weight, preferably from about 0.05 to 1 percent by weight. The foam inhibitors are highly effective despite the absence of finely dispersed silica, silicic acid, or alumina, but they do not reduce the gloss and they prevent the formation of disturbing microfoams with considerably greater dependability. Gloss inks with the incorporated foam inhibitor are stable on storing. The gloss of the applied lacquers also is considerably greater than that of comparable lacquers prepared without addition of the foam inhibiting composition according to the invention. Also, the good resistance of the foam inhibitors to hydrolysis, which makes them suitable for a wide range of applications, should be noted.

The following examples are intended to illustrate the invention and should not be construed as limiting the invention thereto.

EXAMPLES

I. Preparation of the Starting Compounds (a) Allyl alcohol and propylene oxide in a molar ratio of 1:64 were reacted by a known method at 110° to 130° C., in the presence of KOH as catalyst, to prepare an allyl alcohol/propylene oxide adduct. The catalyst was neutralized by the addition of acetic acid, and the product was degassed by heating to 130° C. under vacuum and subsequently filtered. The polyester had the following analytical data:
Hydroxyl number: 43.9
Iodine number: 12.4
Acid number: 0.4

Value x of the oxypropylene groups (determined by gel chromatograph):40

(b) Concurrent hydrolysis of dimethyldichlorosilane and dimethylchlorosilane at a molar ratio of 5:1, subsequent equilibration of the cohydrolysate in the presence of bleaching earth, and subsequent removal of volatile components at 150° C. under vacuum yielded a polysiloxane with hydrogen atoms in position α,ω, with y=15.1. The polysiloxane was determined to have a bound hydrogen content of 0.171%.

II. Preparation of the Block Polymer

Block Polymer A-1

Three hundred and forty-four grams of the compound prepared according to (Ia) above and 0.5 gm of a catalyst containing 5% platinum on activated charcoal, were mixed with 118 gm of the siloxane prepared according to (Ib) above, over a period of 30 minutes at 100° C. under nitrogen gas, with agitation. The mixture was kept at 100° C. for another 2 hours, then heated to 150° C. for 3 hours, and subsequently cooled and filtered. The product obtained had the following analytical data:

Viscosity (20° C.): 580 mPa.s
Density (20° C.): 0.9897 gcm$^{-3}$
Iodine number: 2.4
Hydroxyl number: 33.0

The hydroxyl number of the reaction product corresponds to that of the allyl alcohol/propylene oxide adduct used, provided that the dilution with siloxane is taken into consideration. This demonstrates that no reaction took place between the hydroxyl groups and the Si-H-groups.

Two maxima corresponding to a molar mass of 5900 and 3400, resepectively, were observed in the gel permeation chromatogram (GPC). Consequently, two compounds were present, a polyether siloxane polyether with n=0 and m=1 (content of approximately 70%) and a polyether siloxane with n=0 and m=0 (content of approximately 30%).

Block Polymer A-2

An allyl alcohol/propylene oxide adduct prepared analogously to the procedure described in I(a) had the following analytical data:

Hydroxyl number: 36.3
Iodine number: 14.5
Acid number: 0.4
Value x of the propylene groups (determined by gel chromatograph): 57

Three hundred and seventy-nine grams of the product were dissolved in 400 ml of toluene and mixed with hexachloroplatinic acid (dissolved in tert.butanol) in an amount corresponding to 20 mg platinum. An amount of 114.7 gm of a siloxane prepared analogously to the procedure of I(b) with a mean y value of 14.7 was added dropwise with agitation over a period of 30 minutes at 90° C. and under nitrogen. The mixture was kept at 90° C. until no Si-H-bands could be detected in the infrared spectrum of a sample (appoximately 5 hours). The catalyst was removed by mixing the solution at 80° C. with activated charcoal and filtering, after which the toluene was distilled off under vacuum.

The product obtained had the following analytical data:

Viscosity (20° C.): 1170 mPa.s
Density (20° C.): 0.9947 gcm$^{-3}$
Iodine number: 2.1
Hydroxyl number: 19.9

The GPC of the compound revealed two maxima corresponding to a molecular weight of 7900 (m=1, n=0) with a proportion of approximately 60 percent by weight and to a molecular weight of 4500 (m=0, n=0) with a proportion of approximately 30 percent by weight. The GPC also showed a shoulder at a molecular weight of approximately 12,500 and a proportion of approximately 10 percent by weight. A block polymer with m=1 and n=1 can be assigned to this molar mass.

Additional compounds were prepared in a similar manner by the described addition of allyl alcohol/propylene oxide adducts (designated as A, chain length x from GPC, in the table below) to polymethyl-H-siloxanes (B, chain length=y). The compounds and their viscosities, were as follows:

TABLE 1

| Block polymer | Amount A (gm) | Amount B (gm) | x | y | Viscosity (mPa.s) |
|---|---|---|---|---|---|
| A-3 | 219.8 | 72.5 | 60 | 18.8 | 549 |
| A-4 | 170.0 | 61.5 | 42 | 15.8 | 317 |
| A-5 | 177.8 | 72.0 | 42 | 18.8 | 347 |

Comparison Products

Methylpolysiloxane-polyoxypropylene block copolymers according to German Pat. No. 23 45 335 with the structure

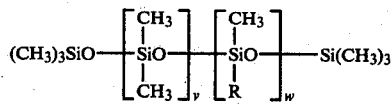

where R represents the group

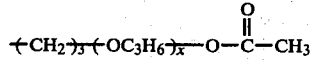

and v=20, w=5, and x=13, were synthesized according to the procedure set forth in U.S. Pat. No. 3,398,104, incorporated herein by reference, for comparison. The comparison product was mixed with finely dispersed silicic acid (Aerosil R 972, available from Degussa) in such an amount that the final product contained 7.5 percent by weight of Aerosil.

III. Composition of the Foam Inhibitors

The above-described block polymers were used to prepare the foam inhibitor formulations recorded in the tables below (amounts in percent by weight). The abbreviations EO and PO stand for mols of ethylene oxide and propylene oxide, respectively.

TABLE 2

| Component | Examples | | | | |
|---|---|---|---|---|---|
| | 1 | 2 | 3 | 4 | 5 |
| Polysiloxane block polymer | 6.0 (A-1) | 6.0 (A-2) | 5.5 (A-3) | 6.5 (A-4) | 6.0 (A-5) |
| Mineral oil (naphthene base) | 70.0 | 70.0 | 70.0 | 74.0 | 72.0 |
| Dibehenic acid ester of a block polymer of 35 PO + 10 EO | 10.0 | 10.0 | 10.5 | 8.0 | 9.5 |
| Block polymer of 30 PO + 4.5 EO | 7.0 | 7.0 | 7.0 | 6.0 | 6.5 |
| Nonylphenol + 9.5 EO | 2.5 | 2.5 | 2.5 | 2.5 | 2.5 |
| Mg—distearate | 3.0 | 3.0 | 3.0 | 2.0 | 2.0 |

TABLE 2-continued

| Component | Examples | | | | |
|---|---|---|---|---|---|
| | 1 | 2 | 3 | 4 | 5 |
| Al—distearate | 1.5 | 1.5 | 1.5 | 1.0 | 1.5 |

TABLE 3

| Component | Examples | | | | |
|---|---|---|---|---|---|
| | 6 | 7 | 8 | 9 | 10 |
| Polysiloxane block polymer | 6.0 (A-1) | 6.5 (A-2) | 6.0 (A-3) | 6.5 (A-4) | 5.5 (A-5) |
| Mineral oil (naphthene base) | 81.5 | 80.5 | 82.0 | 82.0 | 80.0 |
| Hydroxystearyl monobehenate | 7.0 | 8.5 | 7.5 | 7.0 | 9.5 |
| Oleyl alcohol + 6 EO | 3.0 | 3.0 | 3.0 | 3.0 | 3.0 |
| Al—distearate | 1.5 | 1.0 | 1.0 | 1.0 | 1.5 |
| Al—tristearate | 1.0 | 0.5 | 0.5 | 0.5 | 0.5 |

The homogenized foam inhibitors proved to be completely stable even after 6 to 10 weeks of storage at room temperature (22° C.).

IV. Application Technology Tests

The foam inhibitors were incorporated into the following dispersions for the application technology tests:

1. Silk Gloss Ink
   345 parts by weight of vinyl acetate-vinyl ester copolymer dispersion (~50 percent by weight $H_2O$)
   86 parts by weight of methylcellulose solution (98 percent by weight $H_2O$)
   7 parts by weight of sodium tripolyphosphate
   137 parts by weight of titanium dioxide
   116 parts by weight of calcium carbonate
   168 parts by weight of heavy spar
   5 parts by weight of butyldiglycol acetate
   5 parts by weight of dibutylphthalate
   2 parts by weight of preservative (bromonitrodioxane)
   1 part by weight of ammonia (30%)
   65 parts by weight of water
   5 parts by weight of foam inhibitor according to each of Examples 1 to 10.

2. Dispersion Paints
   404 parts by weight of polyacrylate copolymer dispersion (~50 percent by weight $H_2O$)
   165 parts by weight of methylcellulose solution (98 percent by weight $H_2O$)
   2 parts by weight of sodium polyacrylate
   3 parts by weight of sodium tripolyphosphate
   8 parts by weight of butyl glycol
   23 parts by weight of benzine, high-boiling fractions
   158 parts by weight of titanium dioxide
   158 parts by weight of dolomite
   38 parts by weight of mica
   38 parts by weight of talcum
   1 part by weight of preservative
   1 part by weight of ammonia
   5 parts by weight of foam inhibitor according to each of Examples 1 to 10.

3. Gloss Lacquer
   504 parts by weight of acrylopolymer dispersion (~50 percent by weight of $H_2O$)
   74 parts by weight of propylene glycol
   2 parts by weight of sodium polyacrylate
   252 parts by weight of titanium dioxide
   81 parts by weight of ammonium polyacrylate solution (97.5 percent by weight $H_2O$)
   8 parts by weight of preservative
   17 parts by weight of 2,2,4-trimethylpentan-1,2-diol diisobutyrate
   30 parts by weight of water
   1 part by weight of foam inhibitor according to each of Examples 1 to 10.

The following application technological tests were performed with the dispersions prepared:

Testing the Finished Dispersions

Immediately after the preparation of each dispersion, 80 parts by weight of the dispersion were mixed with 20 parts by weight of water and agitated for 1 minute at 2000 rpm with a stirring device (dispersing disc 40 mm $\phi$). A tared cylinder was filled to the 50 ml line with this mixture, and the weight of this amount of liquid was determined. The greater the weight of the sample, the lower the content of air, and thus the better the effect of the foam inhibitor. The inclusion of air was recorded in percent, based on a foam-free (ideal) dispersion.

Doctor Test on Glass Plates

This test was performed with a film-pulling instrument. A dispersion containing foam inhibitor was poured into the frame of the doctor, which was then pulled at a uniform rate across a plane surface. The film formed dried in the air and was then evaluated for air inclusion (microfoam) and flow disturbances or silicone disturbances. In the case of the gloss lacquer (Formulation IV 3), the gloss of the surface was measured (by GARDNER) initially as well as 24 hours later.

Test with Lamb's Wool Roller (on Glass Plates)

After the preparation of each dispersion,
80 parts of dispersion, and
20 parts of water
were mixed and agitated for 1 minute at 2000 rpm with a dissolver. Then, the sample was applied with the aid of a paint roller (lamb's wool roller) to a thoroughly cleaned glass plate. After drying, the coat was evaluated visually for air inclusions (formation of bubbles).

Test with Sponge Roller (on Hardboards)

Hardboards measuring 20×30×0.4 cm were primed on the smooth side with a 1:1 dilution of a plastic dispersion, by use of a brush. Then, 60 to 70 g of dispersion were placed on this board and evenly distributed with a sponge roller so that 15 g wet dispersion (=250 g/m$^2$) remained on it.

The sponge roller with a width of 6 cm and a diameter of 7 cm consisted of polyurethane foam with open pores. The use of such a roller offered the advantage that, in addition to the evaluation of the foam bubbles included in the dispersion, additional air was worked into the coat of dispersion, which also occurs during application with a brush, although to a lesser degree.

The dry coats were evaluated according to the following comparison scale:
1 = very pronounced inclusion of air
2 = pronounced inclusion of air
3 = moderate inclusion of air
4 = little inclusion of air
5 = very little inclusion of air
6 = no inclusion of air The results are set forth in the following table:

TABLE 4

|  | Air inclusion (percent by weight) | Doctor Test Inclusions (grade) | Doctor Test Gloss | Application to Glass Plate (grade) | Application to Hardboard (grade) |
|---|---|---|---|---|---|
| Silk gloss ink* | 17.1–19.5 | 5–6 | — | 3–4 | 4 |
| Comparison | 26.5 | 2 | — | 3 | 3 |
| Dispersion paint* | 11.7–14.2 | 4 | — | 4 | 4 |
| Comparison | 27.4 | 2 | — | 3 | 3 |
| Dispersion lacquer* | 13.5–15.6 | 5–6 | 42–58 | 3–4 | 4–5 |
| Comparison | 17.9 | 3 | 24.6 | 2 | 3 |

*Dispersions containing each of Examples 1 to 10 were used; values given represent ranges determined for the different dispersions, where appropriate.

The above results demonstrate the superiority of the foam inhibiting compositions according to the invention.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A microfoam inhibiting composition which comprises:
   (a) from about 3 to 10 percent by weight of a polysiloxane-polyether block polymer of the formula

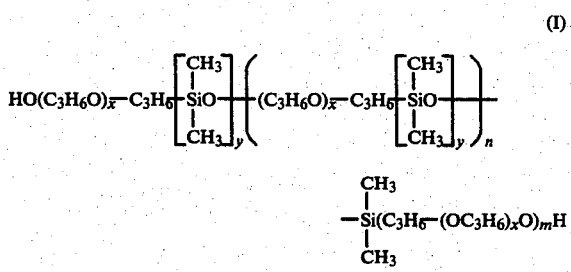

(I)

$$-\underset{CH_3}{\underset{|}{Si}}(C_3H_6-(OC_3H_6)_xO)_mH$$

wherein m is 0 or 1, n is a number of from 0 to 2, x is a number of from 20 to 100, and y is a number of from 5 to 30;
   (b) from about 65 to 85 percent by weight of a water-immiscible oily substance selected from the group consisting of mineral oils, fatty oils, and fatty alcohols;
   (c) from about 5 to 30 percent by weight of at least one additional substance with a foam-inhibiting effect selected from the group consisting of polypropylene glycol-polyethylene glycol block polymers with a molecular weight of from about 1000 to 4000, their monoesters or diesters with fatty acids and hydroxy-fatty acids containing from 18 to 24 carbon atoms, and the monoesters and diesters of said fatty acids and hydroxy-fatty acids with hydroxystearyl alcohol;
   (d) from about 1 to 6 percent by weight of at least one emulsifying agent selected from the group consisting of polyglycol ether derivatives containing from 4 to 12 ethylene glycol ether groups adducted onto alkanols or alkenols with from 12 to 20 carbon atoms or alkylphenols with from 8 to 12 alkylcarbon atoms; and
   (e) from about 1 to 5 percent by weight of at least one alkaline earth metal soap or aluminum soap of fatty acid containing from 16 to 20 carbon atoms, based on the weight of the total microfoam inhibiting composition.

2. The microfoam inhibiting composition of claim 1 which comprises from about 4 to 8 percent by weight of component (a) and wherein n=0 or 1, x=30 to 60, and y=10 to 20.

3. The microfoam inhibiting composition of claim 1 or 2, which comprises from about 70 to 82 percent by weight of a mineral oil as component (b).

4. The microfoam inhibiting composition of claim 1 or 2, which comprises from about 10 to 20 percent by weight of component (c).

5. The microfoam inhibiting composition of claim 1 or 2, which comprises from about 2 to 5 percent by weight of component (d).

6. The microfoam inhibiting composition of claim 1 or 2, wherein component (e) comprises from about 2 to 4 percent by weight of a magnesium or aluminum salt of stearic acid.

7. The microfoam inhibiting composition of claim 1, which comprises from about 4 to 8 percent by weight of a polysiloxane-polyether block polymer of Formula I wherein n=0 or 1, x=30 to 60, and y=10 to 20 as component (a); from about 70 to 82 percent by weight of a mineral oil as component (b); from about 10 to 20 percent by weight of component (c); from about 2 to 5 percent by weight of component (d); and from about 2 to 4 percent by weight of a magnesium or aluminum salt of stearic acid as component (e).

8. A method of inhibiting microfoam formation in an aqueous dispersion of synthetic resin, lacquer, or paint, which comprises admixing a microfoam-inhibiting effective amount of a composition of claim 1.

* * * * *